(12) United States Patent
Willits (10) Patent No.: US 6,994,441 B2
(45) Date of Patent: Feb. 7, 2006

(54) ADAPTIVE REFLECTING SYSTEM

(75) Inventor: Jeffrey Neil Willits, Lahaina, HI (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 10/671,398

(22) Filed: Sep. 24, 2003

(65) Prior Publication Data

US 2005/0063078 A1   Mar. 24, 2005

(51) Int. Cl.
*G02B 5/08* (2006.01)
(52) U.S. Cl. .................. 359/847; 359/855; 359/872
(58) Field of Classification Search ........ 359/223–226, 359/847–851, 853–855, 865, 871, 872; 337/123, 337/126, 137, 139
See application file for complete search history.

(56) References Cited

U.S. PATENT DOCUMENTS

| | | | |
|---|---|---|---|
| 3,588,231 A * | 6/1971 | Platzer, Jr. ................. | 359/604 |
| 4,463,560 A | 8/1984 | Greenleaf et al. | |
| 4,493,568 A * | 1/1985 | Estabrooks ............ | 400/124.19 |
| RE35,446 E | 2/1997 | Stone | |
| 6,087,638 A | 7/2000 | Silverbrook | |
| 6,531,947 B1 | 3/2003 | Weaver et al. | |
| 6,574,026 B2 * | 6/2003 | Jin et al. ................... | 359/224 |

FOREIGN PATENT DOCUMENTS

| | | |
|---|---|---|
| WO | WO 0067063 A1 | 11/2000 |
| WO | WO 0237162 A2 | 5/2002 |
| WO | WO 02/088018 A2 | 11/2002 |
| WO | WO 03022731 A1 | 3/2003 |

OTHER PUBLICATIONS

Gray et al., "Support and Actuation of Six Secondaries for the 6.5m MMT and 8.4m LBT Telescopes", Proceedings of SPIE conference on Optical Telescopes of Today and Tomorrow, 2871, (1996).

Joshi, "Compact Magnetostrictive Actuators and Linear Motors", Actuator 2000 Conference, Bremen, Germany (Jun. 2000).

G. Brusa et al., "From adaptive secondary mirrors to extra-thin large adaptive primary mirrors", http://arcetri.astro.it/~brusa/backaskog.ps.gz, Osservatorio Astrofisico di Arcetri, Firenze, Italy.

* cited by examiner

*Primary Examiner*—Euncha P. Cherry
(74) *Attorney, Agent, or Firm*—Shimokaji & Associates, P.C.

(57) ABSTRACT

A system which features an actuator mechanism for controlling orientations of reflecting surfaces of an optical reflector or antenna is disclosed. As integrated into the system, the actuator may control both pan and tilt characteristics of reflective surfaces to create an adaptive system for focusing or otherwise directing light or other radiation. The invention is suited to large aperture, low density, and high surface accuracy segmented optical or other electromagnetic wave receivers needed for terrestrial and space-deployed applications in fields such as astronomy, communications, earth imaging, and directed energy.

38 Claims, 9 Drawing Sheets

ADAPTIVE REFLECTING SYSTEM

BACKGROUND OF THE INVENTION

The present invention generally relates to adaptive optics and, more particularly, to a segmented reflecting system and an actuator for providing position adjustment of individual optical elements of a segmented reflecting system.

Launch costs and payload volume restrictions currently prohibit sending extremely large reflecting mirror or antenna systems into space. Space-based systems also have stringent weight requirements because of the cost of sending a payload into space. There are several motivations, however, to develop these systems for defense and commercial telescopes and directed energy applications. For example, design of large and low-weight structures for optics and antennas is a primary technology to be developed for the U.S. Air Force (USAF), as identified by the USAF Scientific Advisory Board. In addition, the Jet Propulsion Laboratory (JPL) is studying proposals for a terrestrial planet finder space telescope, which is an example of a project that needs a lightweight mirror system that can provide massive light-gathering capacity, while allowing compact stowage in a spacecraft payload compartment. Even the relatively small Hubble space telescope mirror is very heavy at 200 kilograms (Kg). At a typical rate of $30 thousand per kilogram for launch costs, ground glass mirrors such as the Hubble mirror represent an inefficient solution for reflecting systems in space.

Thus, new methods to provide extremely large and accurate optical and antenna systems that accommodate launch constraints are needed. Some of the proposed methods include using low-weight materials. Design of single-piece structures with accurate geometry, however, is difficult with any material. Attaching reflectors to large foldable structures involves challenges in packing the foldable structures within payload compartments. Another problem with foldable structures is that there must be components within the design that function just to allow the foldable structure to be collapsed for launch and deployed in space. The components enabling this add cost and weight without providing functional value.

Free-flying mirrors have also been proposed that can be adaptively controlled for positioning in space. These segmented systems with their large reflecting surfaces, however, entail design challenges similar to those of any large system so that the practical assembly of these huge reflecting systems would still require launching large structures. An additional proposal includes making adaptive membrane mirrors. An obstacle to this approach is that it is difficult to correct local aberrations in the membrane surface without affecting the form of the surrounding reflecting area.

Typical space-based telescope or antenna systems include radiation sensitive components attached to a supporting structure. The radiation sensitive components can be optical devices—such as mirrors—for a telescope or reflectors for a radio wave antenna. These systems also typically include an alignment apparatus for directing the radiation sensitive component at a desired target. The alignment apparatus may also be used to make fine adjustments to the position of the radiation sensitive component to improve the image of the desired target. In general, an alignment apparatus may include the ability to accurately control the position of one part of a system relative to a second part, either to effect a relative displacement between the parts or to maintain a desired spatial relationship between the parts. One type of device used in the art for position control is the actuator mechanism. Actuator mechanisms, however, tend to be mechanical in nature and, consequently, can be heavy and unreliable.

One such actuator mechanism is an "inch worm" type linear actuator in which high resolution is achieved by directly moving an actuator armature in small steps using thermal, piezoelectric, electromagnetic, or magnetostrictive armature translators. For example, ceramics exhibiting the piezoelectric effect have been used as actuators for accurate positioning purposes, but the range of movement is small—about 5 micrometers ($\mu$m)—and relatively large voltages are required for their operation. Such armature translators can easily move the armature in nanometer range increments and can exert very large forces, since they rely on the stiffness of an expanding or contracting material. Sequential operation of paired, electromagnetic clamp assemblies and the armature translator provides a step-wise linear motion. When power is removed, the mechanism prevents further motion of the armature. Due to their weight and power requirements, however, these actuator mechanisms generally are not suitable for large, space-based telescope and antenna systems. Because of the weight constraints described above, it is desired to reduce the weight of the various components and to provide lightweight and reliable components for use in space-based telescope and antenna systems.

Terrestrial optical and antenna systems, used where gravity is significant, may also benefit from the use of lightweight reflecting systems. Any terrestrial mirror system will deform when its orientation to gravity is changed, for example, by aiming the system. The use of heavy monolithic mirrors addresses the problem by designing the mirror structure with high stiffness. However, regardless of stiffness, weight is always a factor due to deformation of the mirror structure from gravity. An approach is needed that allows the system to adapt to changing gravity loads and other factors that cause deformations.

As can be seen, there is a need for a lightweight mirror system that can provide massive light-gathering capacity, while allowing compact stowage in a spacecraft payload compartment. There is also a need for a compact and low mass actuator mechanism for terrestrial and space-based reflecting systems.

SUMMARY OF THE INVENTION

In one aspect of the present invention, an actuator mechanism for movement along a support membrane structure includes a ferromagnetic plug with a first coefficient of thermal expansion and a first coefficient of friction. The ferromagnetic plug is positioned on a surface of the support membrane structure and is magnetically coupled to the support membrane structure. The actuator mechanism also includes a center band with a third coefficient of friction, the center band being positioned on the surface of the support membrane structure and fixedly attached to the ferromagnetic plug, the center band encircles the ferromagnetic plug. The actuator mechanism includes an actuator material region with a second coefficient of thermal expansion. The actuator material region is positioned on the surface of the support membrane structure and adjacent to the center band. The actuator material region is separated from the ferromagnetic plug by the center band. Further, the actuator mechanism includes an outer band with a second coefficient of friction fixedly attached to the actuator material region. The outer band is positioned on the surface of the support membrane structure and adjacent to the actuator material region. The outer band is magnetically coupled to the support membrane structure.

In another aspect of the present invention, an actuator mechanism for movement along a diamagnetic support membrane structure includes a ferromagnetic plug with a first coefficient of thermal expansion and a first coefficient of friction. The ferromagnetic plug is positioned on a surface of the support membrane structure and the ferromagnetic plug is capable of expanding in a direction perpendicular to the surface of the support membrane structure. The actuator mechanism also includes a center band with a third coefficient of friction where the center band is positioned on the surface of the support membrane structure and is fixedly attached to the ferromagnetic plug. The center band encircles the ferromagnetic plug. The actuator mechanism further includes an actuator material region with a second coefficient of thermal expansion where the actuator material region is positioned on the surface of the support membrane structure and around the ferromagnetic plug. The actuator material region is capable of expanding in a direction parallel to the surface of the support membrane structure. Also, the actuator mechanism includes an outer band with a second coefficient of friction where the outer band is positioned on the side of the support membrane structure and encircling the actuator material region. The actuator mechanism includes a first magnetic region positioned on the opposed surface of the support membrane structure and adjacent to the ferromagnetic plug. Further, the actuator mechanism includes a second magnetic region positioned on the opposed surface of the support membrane structure and adjacent to the outer band.

In still another aspect of the present invention, an optical reflector or electromagnetic wave antenna system includes a diamagnetic support membrane structure with an actuator mechanism positioned on a surface of the support membrane structure. The actuator mechanism includes a ferromagnetic plug with a first coefficient of thermal expansion and a first coefficient of friction; the ferromagnetic plug is positioned on a surface of the support membrane structure where the ferromagnetic plug is capable of expanding in a direction perpendicular to the surface of the support membrane structure. The actuator mechanism includes a first band with a third coefficient of friction where the first band is positioned on the side of the support membrane structure and is fixedly attached to the ferromagnetic plug. The first band encircles the ferromagnetic plug. The actuator mechanism further includes an actuator material region with a second coefficient of thermal expansion where the actuator material region is positioned on the surface of the support membrane structure and around the first band. The actuator material region is capable of expanding in a direction parallel to the surface of the support membrane structure. The actuator mechanism also includes a second band with a second coefficient of friction where the second band is positioned on the surface of the support membrane structure and around the actuator material region. The second band is fixedly attached to the actuator material. Also, the actuator mechanism includes a first magnetic region positioned on an opposed surface of the diamagnetic support membrane structure and magnetically coupled to the ferromagnetic plug. Further, the actuator mechanism includes a second magnetic region positioned on the opposed surface of the diamagnetic support membrane structure and magnetically coupled to the second band.

The reflector or antenna system further includes an adjustment beam magnetically coupled to the first magnetic region and a frame structure connected to the adjustment beam. Also, the system includes a reflector segment fixedly attached to the adjustment beam and at least one heat source capable of heating the ferromagnetic plug and the actuator material region.

In yet another aspect of the present invention, a method of moving an actuator mechanism along a support membrane structure includes the steps of increasing a first temperature of a ferromagnetic plug wherein the ferromagnetic plug expands in a direction perpendicular to a surface of the support membrane structure lifting a center band off the surface of the support membrane structure; increasing a second temperature of an actuator material region at a first position wherein the actuator material region expands at the first position in a direction parallel to the surface of the support membrane structure moving the ferromagnetic plug and center band in a direction parallel to the surface of the support membrane structure; decreasing the first temperature so that the ferromagnetic plug contracts and the center band frictionally engages the surface of the support membrane structure; decreasing the second temperature; and increasing a third temperature of the actuator material at a second position wherein the actuator material region expands at the second position in a direction parallel to the surface of the support membrane structure.

In another aspect of the present invention, a method of adjusting and locking angular orientations of reflective elements of an optical reflector or antenna system relative to a support membrane structure includes the steps of directing a first beam of light onto a ferromagnetic plug magnetically coupled to a reflector segment, the first beam of light causing a first temperature in the ferromagnetic plug to increase wherein the ferromagnetic plug expands in a direction perpendicular to a surface of the support membrane structure, lifting a center band encircling the ferromagnetic plug off the surface of the support membrane structure; directing a second beam of light onto an actuator material region encircling the center band, the second beam of light causing a second temperature in the actuator material region to increase at a first position wherein the actuator material region expands in a direction parallel to the surface of the support membrane structure, moving the ferromagnetic plug, center band, and elements of the system that are attached to reflecting components in a direction parallel to the surface of the support membrane structure; turning off the first beam of light causing the second temperature to decrease so that the center band frictionally engages the surface of the support membrane structure; turning off the second beam of light causing the second temperature to decrease; and directing at least one of the first and second beams of light onto the actuator material region at a second position causing the outer band to move in a direction parallel to the surface of the support membrane structure to become centered about a center of the ferromagnetic plug.

These and other features, aspects, and advantages of the present invention will become better understood with reference to the following drawings, description, and claims.

DETAILED DESCRIPTION OF THE INVENTION

The following detailed description is of the best currently contemplated mode of carrying out the invention. The description is not to be taken in a limiting sense, but is made merely for the purpose of illustrating the general principles of the invention, since the scope of the invention is best defined by the appended claims.

Broadly, an embodiment of the present invention provides a lightweight, segmented, adaptive reflector system that may be used, for example, as an adaptive optical telescope reflector, a reflector for a radio wave antenna, or a reflector for directed-energy applications. When used as a spaceborne adaptive optical telescope reflector, for example, one embodiment can provide massive light-gathering capacity, while allowing compact stowage in a spacecraft payload compartment. When used as a reflector for a radio wave antenna, for example, one embodiment provides an antenna dish with an array of elements that are independently adjustable to fine-tune the focus of incident energy to a receiver or from a transmitter. For directed-energy applications, one embodiment may be used as a solar concentrator or to collect energy from a laser beam. For instance, an optical reflector system according to one embodiment could have a laser targeted at it from a great distance in space to receive energy for use at that location or to redirect it elsewhere.

A reflecting system, according to one embodiment, includes a compact and low mass actuator mechanism that may be useful for terrestrial as well as space-based adaptive reflecting systems. With this system, the form of the reflector surface can be continuously adapted using energy from a laser. Because the system can be erected in space from small subassemblies, loads during launch will not be problematic and the assemblies can be designed to use payload space efficiently. The segmented system, according to one embodiment, can be more accurate than prior art systems incorporating a large monolithic structure or adaptable membrane concept because each segment of the segmented system can be individually adjusted and adapted to changing conditions, preventing bending in portions of the reflector that do not require adjustment, in contrast, for example, to prior art adaptable membrane reflectors.

The present invention enables reflecting systems with huge reflecting surface areas and very high optical precision that, in addition, can be lightweight. For example, small reflecting segments can be designed to be very lightweight with high stiffness and high optical precision, yet with low mass because only small forces will act on them in space and because only low forces are needed to correct segment alignments. Extremely large reflecting systems can be assembled with small parts that can be mass produced. A reflecting system, according to an embodiment, may be arbitrarily large, at least in theory, because the individual components included in the system may include extremely low mass materials and any number of reflector segments can be coupled together.

A unique aspect of one embodiment of the present invention is that the orientation of numerous small reflecting segments of the system can be independently controlled throughout a wide angular range. This can occur with extreme precision due to the long adjustment beam and the fine adjustment from the thermal actuators. Energy has to be applied to the actuators only when it is necessary to adjust the position of a reflector because permanent magnets lock the position after the adjustments are made.

In one embodiment, individual adjustment of the reflecting segments is performed using a novel thermal actuator mechanism. According to one embodiment, the thermal actuator mechanism is magnetically attached to a membrane structure, for example, by the attraction of magnets to each other from opposite sides of a non-magnetic membrane structure. The thermal actuator mechanism may have three different contact surfaces with which to contact the membrane structure, respectively having a high, intermediate, and low coefficient of friction in relation to the membrane, and structurally arranged in a novel manner. When the actuator mechanism is energized, for example, by a laser beam from a remote source, the high friction contact surface can be lifted off the membrane structure through thermal expansion of a ferromagnetic plug, leaving the low friction contact surface on the membrane. At another part of the actuator, the intermediate friction contact surface remains in contact with the membrane structure. Thermal expansion of an actuator material region is used by the low friction contact surface to push against the intermediate friction contact surface, sliding the high (still lifted) and low friction contact surfaces together across the membrane structure. Cooling of the ferromagnetic plug returns the high friction contact surface into contact with the membrane structure. Thermal expansion of another part of the actuator material region is then used by the intermediate friction contact surface to push against the high friction contact surface, sliding the intermediate friction contact surface across the membrane structure to "catch up" again to the high and low friction contact surfaces. Thus, the actuator mechanism "walks" across the membrane structure. By coupling such an actuator to each reflector segment through a long adjustment beam, as in one embodiment, precise and accurate reflector segment adjustments can be made individually for each segment. The actuator mechanism may provide precision control in small increments and yet may allow gross movements, for example, by repetitive actuations.

A reflecting system with actuator mechanisms according to an embodiment of the present invention may exhibit several advantages over the prior art. For example, actuator reactions occur locally, minimizing bending of the support structure. Actuator movements depend on the energy level with which they are activated and the coefficient of thermal expansion (CTE) of the expanding material, allowing for extreme precision. Use of the long adjustment beam further increases precision. Actuators can be produced in miniature size, with low weight, and low cost with mass production processes. Mirror segments and actuators are held onto the supporting structure with magnetic force, making assembly simple. Since magnets are used, fasteners and installation tools are not needed. Some applications may use magnets for joining components of the main structure assembly. System repairs and replacement will be simple, since fasteners are not used for assembly. Segments can be controlled throughout a wide angular range. Depending on design factors, this may allow for simple supporting structures that are planar. Adjustments are self-locking and energy only has to be applied to the system as needed to make individual adjustments of the reflector segments. Lasers can be used to transmit energy for the actuators, which can be an important reduction of prior art wiring costs or similar costs incurred using other energy transmitting methods. In addition, transmission losses would be minimal in space for laser light, which can be an important design cost factor for space-based systems. In space, the light source apparatus may be free-flying and may be directed to target points on the actuator mechanism using algorithms and methods associated with established metrology technologies.

A system according to an embodiment of the present invention can be used for active control whether the actuators are energized by laser light, piezoelectric material, or other methods; however, it is most applicable as an intermittently adjusted system when lasers are used. A laser-controlled system that uses this reflector system can be active if aberrations from the main reflector are corrected in real-time with controls on the sensor optics.

A segmented reflecting system according to an embodiment of the present invention realizes cost and weight savings advantages over the prior art because segment actuators can be of miniature size, low mass, and low-cost. Automated fabrication techniques such as laser metal sintering, which require no specialized tooling, can be used for efficient component fabrication. Low cost design attributes will be important to production of any large-scale segmented precision mirror or antenna—especially when the system must have numerous segments. For instance, a circular reflecting system with a 10 meter (m) aperture and 10 centimeter (cm) diameter segments would require approximately 7,800 segments. Competing systems that use multiple conventional linear actuators for each segment would have to multiply weights and costs by the number of actuators per segment. If each conventional actuator must be connected into a structure on each end and there were three actuators per reflector segment, the number of connection features would be 46,800. By way of contrast, an embodiment of the present invention allows for just one actuator per segment that can be easily attached with magnetic attraction, avoiding fasteners or adhesives. In addition, these actuators allow wide travel with unlimited angular range and ultra-precision adjustment. While the actuators can accommodate extremely fine movements, the adjustment beam will compound the degree of adjustment precision based on the length of the beam.

A lightweight system, according to one embodiment, may be best suited for space applications where wind and gravity loads are not factors. With structures sized for wind and gravity loads, however, an embodiment of the present invention is applicable to land-based systems. One embodiment of the present invention, for example, allows the reflecting system to adapt to changing gravity loads and other factors that cause deformations. In addition, low weight terrestrial reflector systems may result in positive benefits for support structure designs, such as in reducing costs of beam elements and control devices. In one embodiment, a land-based telescope could be provided with significantly higher precision and light-collecting capacity than any existing land-based telescope. Since weight will be less important for land-based applications, the actuators could be wired rather than remotely energized so that it may be advantageous for terrestrial applications to change the actuator activation from thermal actuation to piezoelectric or some similar type of device.

Embodiments of the present invention include low areal density adaptive reflecting systems for terrestrial and space-based applications. While a practical and lightweight solution is disclosed for reflecting systems, which allows precise and adaptive angular control of reflecting elements, some applications may require focusing with wavelength phase control. Methods to adaptively control the distance of the reflective elements to the focal point of the system may be integrated into the adaptive reflector system that is disclosed here, with the angular control of the reflector segments accomplished as enabled by the present invention. For instance, actuators can be conceived that function in a manner similar to the mechanism disclosed in the present invention which would individually adjust distances of the reflector segments to the focal point of the system. As an alternative to incorporating additional control in the reflector system for focusing, adaptive sensor optics can be used to accommodate aberrations due to wavelength phasing for applications where this is necessary.

Figure 1:
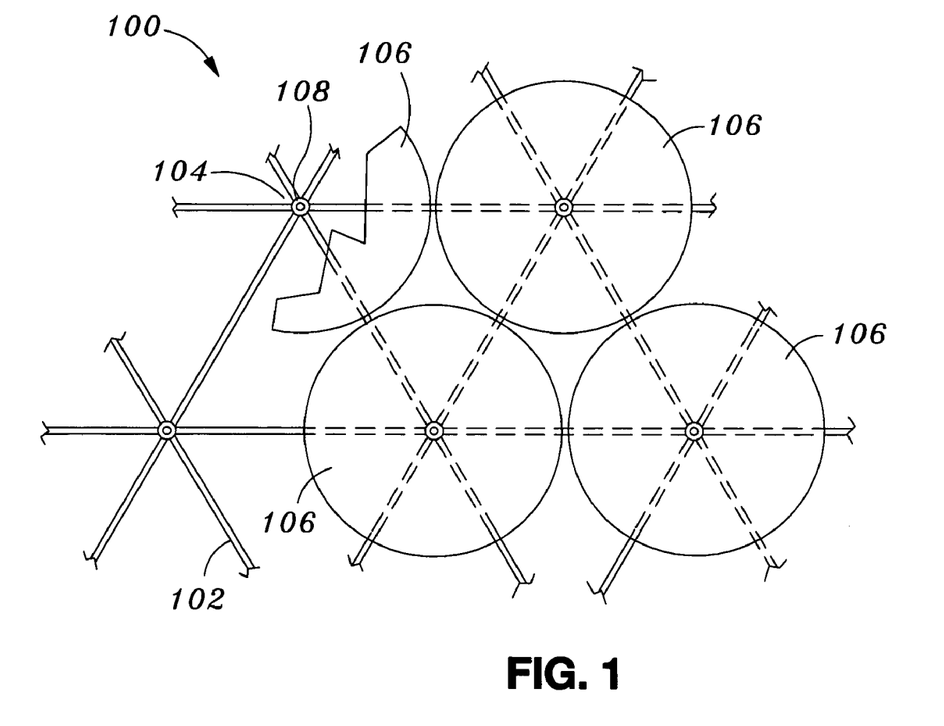
FIG. 1 is a plan view of an exemplary segmented reflector system in accordance with one embodiment of the present invention.

Referring now to the figures, in which like items are referenced with the same numeral, FIG. 1 shows a plan view of an adaptive, segmented, reflecting system 100 in accordance with one embodiment. System 100, for example, may be an optical reflector system for a space telescope or an antenna system array. It will be understood that system 100 may include any mechanical system which may be moved or adjusted with an actuator mechanism and the illustration of an optical reflector or antenna system is for simplicity and ease of discussion. Further, it will be understood that system 100 may be used to transmit or receive electromagnetic radiation in a wavelength region of interest. For example, it is well known in the art that it may be desirable to collect light in the visible or infrared wavelength regions. Further, it will be understood that the chosen wavelength region of interest does not restrict the scope of the invention in any way.

System 100 may comprise an array, as shown in FIG. 1, of independent reflector segments 106 arranged on a space frame structure 102 to form a system of any practical size and shape desired. Reflector segments 106 may be connected to frame structure 102 at nodes 104. Generally, reflector segments 106 may be circular or hexagonal in shape, although it may be understood that reflector segments may have any shape for a desired reflective characteristic, such as rectangular, triangular, or the like. Further, reflective surfaces of reflector segments 106 may be curved or flat.

Figure 2:
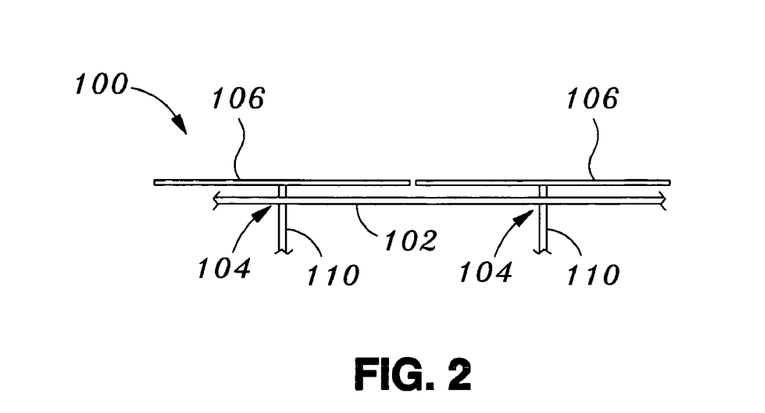
FIG. 2 is a side view of the exemplary segmented reflector system illustrated in FIG. 1.

FIG. 2 shows a side view of system 100, in which it is more clearly seen that each reflector segment 106 may be rigidly attached to an adjustment beam 110. FIG. 2 also shows that each adjustment beam 110 may be connected to frame structure 102 at nodes 104, so that reflector segments 106 may be connected to frame structure 102 at nodes 104, as described above.

Figure 3:
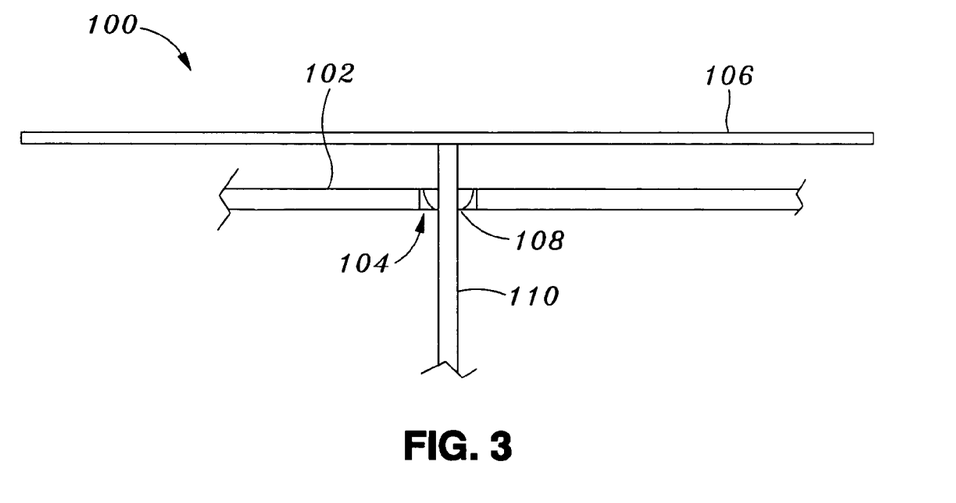
FIG. 3 is a cross-sectional view of a spherical joint of the exemplary segmented reflector system illustrated in FIG. 2.

As more clearly shown in FIG. 3, adjustment beam 110 may be connected to frame structure 102 at node 104 with a spherical joint 108. Spherical joint 108 is shown in cross section in FIG. 3. Spherical joint 108 may allow movement of adjustment beam 110 at node 104 on frame structure 102. For example, spherical joint 108 may allow angular movement of adjustment beam 110 relative to frame structure 102 so that reflector segment 106 may be adjusted to provide focusing of adaptive, segmented, reflecting system 100. Reflector segments 106, space frame structure 102, and adjustment beam 110 may be fabricated, for example, from aluminum, titanium, or other appropriately strong and lightweight materials.

Figures 4A, 4B:
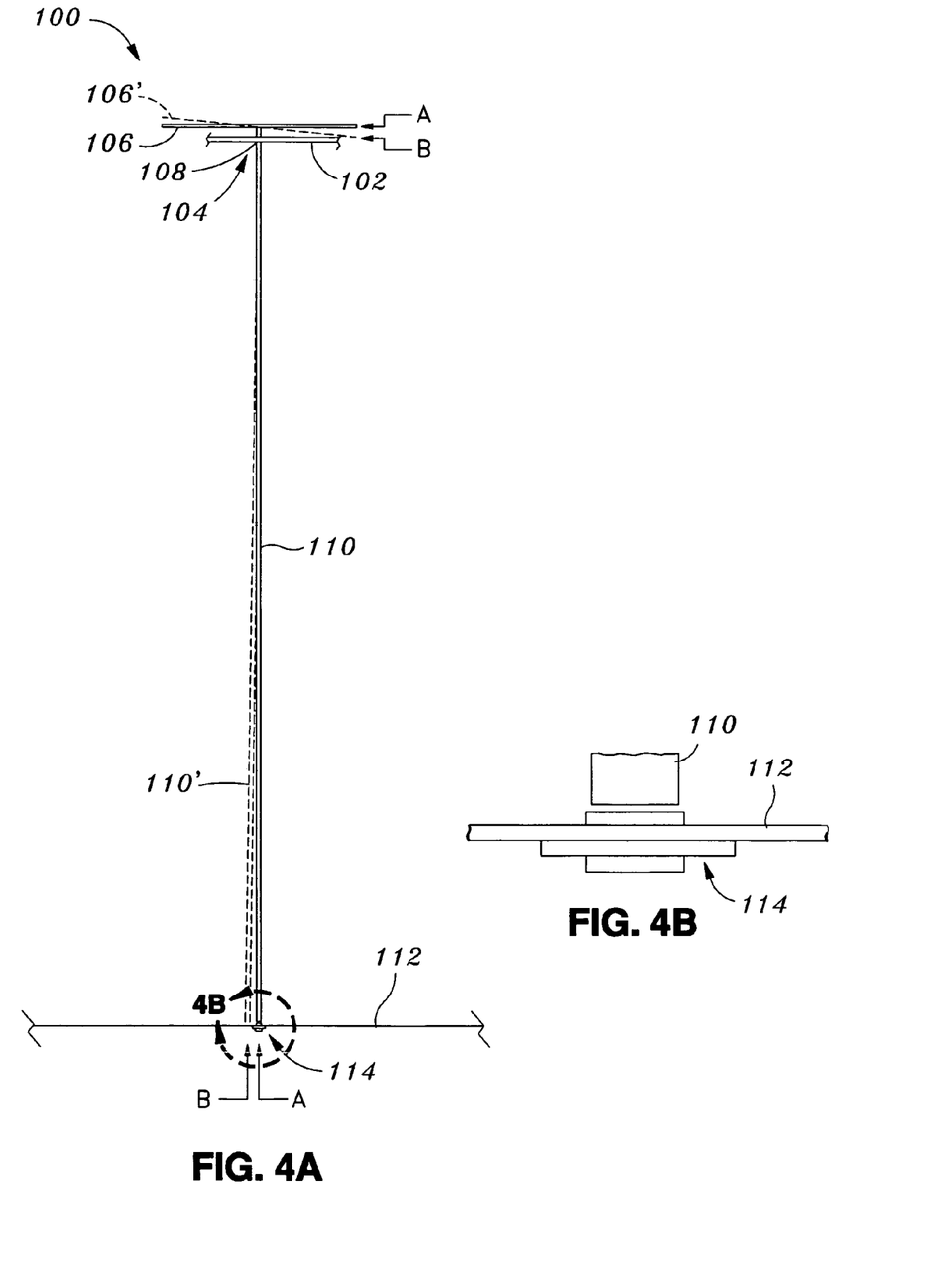
FIG. 4A is a side view of the exemplary segmented reflector system illustrated in FIG. 1, showing additional elements of the system in accordance with one embodiment of the present invention.
FIG. 4B is a detail side view of the exemplary segmented reflector system illustrated in FIG. 4A.

FIG. 4A shows the full length of adjustment beam 110 along with a side view, similar to FIGS. 2 and 3, of a reflector segment 106 and a portion of space frame structure 102. FIG. 4B shows a detail view of the indicated portion of FIG. 4A. As shown in FIGS. 4A and 4B, system 100 may include a diamagnetic support membrane structure 112, which may be comprised of a nonferrous material—such as aluminum—or a lightweight composite material—such as graphite with resin—and thin membrane structural elements.

Membrane structure 112 may support a plurality of actuators, such as actuator 114. Actuator 114 may be magnetically coupled to support membrane structure 112, for example, through magnetic attraction of ferromagnetic plug 132 to magnetic region 128 through diamagnetic support membrane structure 112 or by magnetic attraction of outer ring-like band 134 to magnetic region 126 through diamagnetic support membrane structure 112, as seen more clearly in FIG. 5. Actuator 114 may be magnetically coupled, or attached, to an adjustment beam 110 at the end of adjustment beam 110. Thus, the end of adjustment beam 110 may be attached to support membrane structure 112 via actuator 114. Furthermore, support membrane structure 112 may be attached to frame structure 102 with truss elements or the like.

FIG. 4A also shows adjustment beam 110 and reflector segment 106 at a first position A. A second position B of adjustment beam 110 (marked 110') and corresponding second position B of reflector segment 106 (marked 106'), achieved by movement of actuator 114 from a first position A to a second position B, is shown in phantom. As shown in FIG. 4A, movement of actuator 114 from first position A to second position B may cause adjustment beam 110 to pivot about spherical joint 108 at node 104, producing an angular deflection of reflector segment 106 about spherical joint 108. It should be noted that the angular deflection of reflector segment 106 is shown exaggerated in FIG. 4A for greater clarity of illustration and is not shown to scale with the angular deflection of adjustment beam 110. The long lever arm provided by adjustment beam 110 between actuator 114 and spherical joint 108 compared to the short lever arm provided by adjustment beam 110 between spherical joint 108 and reflector segment 106 provides a large mechanical advantage to actuator 114. Thus, the force required of actuator 114 can be small, as described above. Also the longer adjustment beam 110 is made, the greater is the mechanical advantage, and the finer is the adjustment of reflector segment 106 for a given movement of actuator 114. Thus, the precision of adjustments to reflector segments 106 can be increased as desired by increasing the length of adjustment beam 110.

Figure 5:
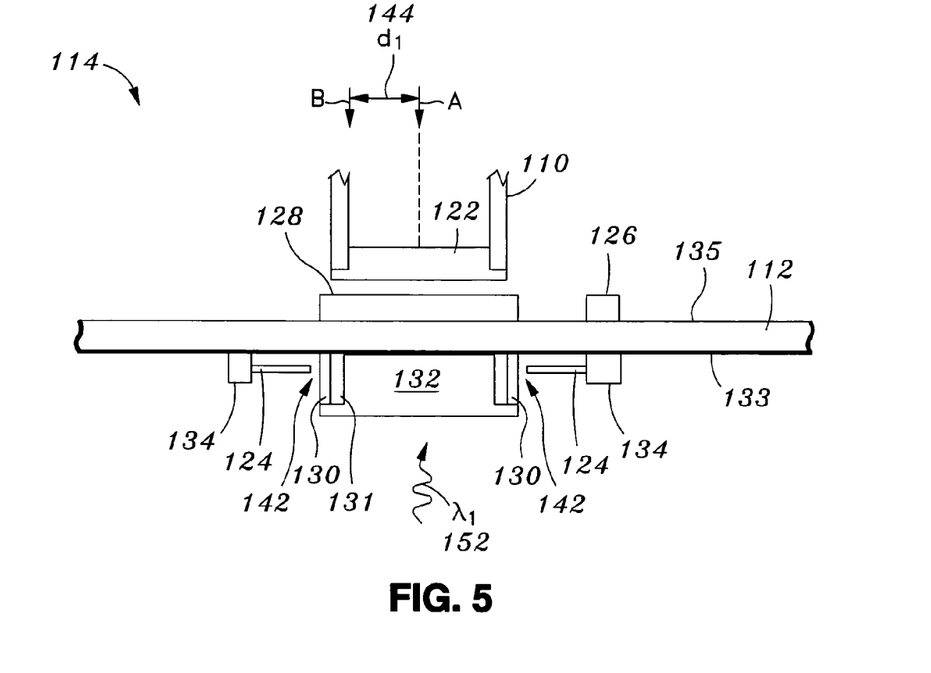
FIG. 5 is a cross-sectional view of an actuator mechanism according to one embodiment of the present invention.
Figure 6:
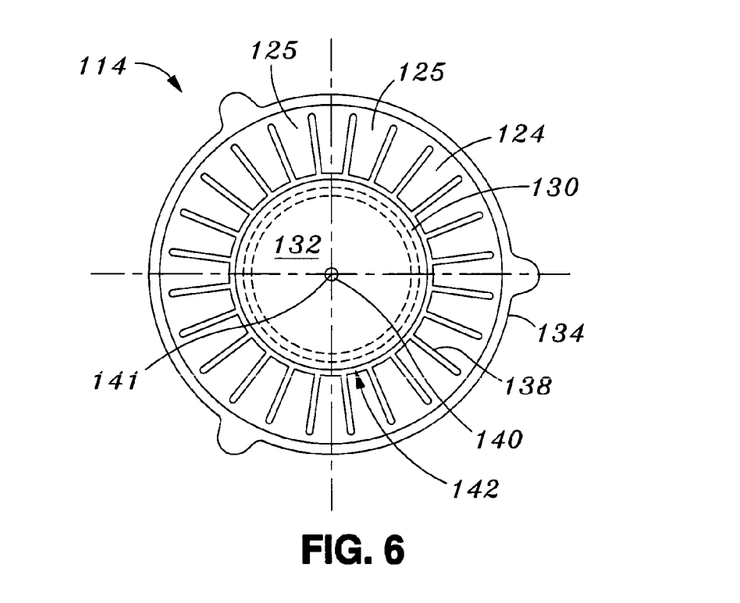
FIG. 6 is a plan view of an actuator mechanism illustrated in FIG. 5.

Referring now to FIGS. 5 and 6, FIG. 5 shows a more detailed cross-sectional view from the same direction as the side view of FIG. 4B, and shows actuator mechanism 114, a portion of support membrane structure 112, and the end of adjustment beam 110 of adaptive, segmented, reflecting system 100 in accordance with one embodiment. Actuator mechanism 114 may include a ferromagnetic plug 132, which may be shaped, for example, in the form of a flat, circular disk, as viewed from the side in FIG. 5 and as viewed from the top in FIG. 6. Ferromagnetic plug 132 may include a ferromagnetic material such as iron, cobalt, or nickel, for example. Ferromagnetic plug 132 may be positioned on, and in contact with, a surface 133 of support membrane structure 112. A center ring-like band 130 may be attached to ferromagnetic plug 132 near the top, or portion, of ferromagnetic plug 132 that is furthest away from surface 133, as shown in cross section in FIG. 5. Center band 130 may be a flat, annular disk and may be formed so that center band 130 may encircle the disk portion of ferromagnetic plug 132. Thus, a portion of center band 130 is shown on either side of ferromagnetic plug 132 in the cross section view of FIG. 5, and the inside boundary of center band 130 is indicated by a dashed circle in the top view of FIG. 6, with a second dashed circle indicating an outside boundary of ferromagnetic plug 132. A gap 131 may be left between center band 130 and ferromagnetic plug 132, where center band 130 encircles ferromagnetic plug 132. Gap 131 may provide thermal insulation between center band 130 and ferromagnetic plug 132. Center band 130 may be positioned on, and in contact with, surface 133 of support membrane structure 112.

Although circular shapes have been chosen to illustrate one embodiment of actuator 114, it is conceivable that other geometric shapes could be used for any of ferromagnetic plug 132, center band 130, and outer band 134. Referring to the shape of any of these as the shape of actuator 114, then, it may be said that while the actuator 114 is shown circular, it could function as any shape. For example, actuator 114 could be square, hexagonal, triangular, an oval with the 2 foci separated only by a small distance, an ovoid, a 20-sided regular polygon, or the like. The actuator 114 does not need to be circular, but it is an obvious design choice to control any angular movement of the reflector segments due to the circle's symmetry to itself in all directions. The circular shape also lends itself to ease of manufacture. Nevertheless, it is conceivable that some other shape may be chosen to meet some particular design consideration for a special application.

Ferromagnetic plug 132 may include ferrous material, for example, and may have a relatively low coefficient of friction relative to surface 133 of support membrane structure 112. Center band 130 may be made of practically any material to include aluminum, titanium, or a variety of plastics. Center band 130 may have a relatively high coefficient of friction relative to surface 133 of support membrane structure 112. The coefficient of thermal expansion of ferromagnetic plug 132 may be sufficiently large so that when ferromagnetic plug 132 is heated, for example, by a laser beam, ferromagnetic plug 132 may be capable of expanding in a direction perpendicular to surface 133 of support membrane structure 112 far enough to lift center band 130 away from and out of contact with surface 133. Thus, the assembly comprising ferromagnetic plug 132 and center band 130 may be "switched" between having a high coefficient of friction and a low coefficient of friction on surface 133 depending on whether ferromagnetic plug 132 is, respectively, either cooled or heated. Gap 131 may improve the lifting action by helping to confine heating and expanding action to ferromagnetic plug 132, so that heating and expanding of center band 130 may be minimized. A reflective target 140, shown in FIG. 6, may be positioned on a center 141 of ferromagnetic plug 132. Target 140 may guide an energy beam, for example, a laser beam, to ferromagnetic plug 132, and may, thus, improve the efficacy of energizing, i.e., heating, ferromagnetic plug 132.

An outer band 134 with a relatively medium coefficient of friction—intermediate between that of ferromagnetic plug 132 and that of center band 130—may be positioned on, and in contact with, surface 133 of support membrane structure 112. Outer band 134 may encircle ferromagnetic plug 132 and center band 130 as shown in FIG. 6. Outer band 134 may be adjacent to, and also encircle, an actuator material region 124. Further, outer band 134 may be fixedly attached to actuator material region 124. Actuator material region 124 may be positioned on or above surface 133 of support membrane structure 112 and adjacent to outer band 134. Actuator material region 124 may encircle center band 130 and may be separated from center band 130 by a gap 142 as shown in FIGS. 5 and 6. The material of actuator material region 124 may be chosen to have a coefficient of thermal expansion so that portions of actuator material region 124 may be capable of expanding in a direction parallel to surface 133 of support membrane structure 112 by an amount, for example, that is twice the width of gap 142. Thus, by heating and expanding a portion of actuator material region 124, closing gap 142, actuator material region 124 can be used to transmit forces between center band 130 and outer band 134 in a direction parallel to surface 133.

As illustrated in FIG. 6, actuator material region 124 may include a plurality of slots 138 extending radially outward from gap 142 around ferromagnetic plug 132, diverging from center 141 of ferromagnetic plug 132, forming a plurality of finger-like segments 125 in actuator material region 124. Slots 138 may inhibit heat conduction between adjacent segments 125 of actuator material region 124 so that selective heating of a desired portion, for example, a single segment 125, of actuator material region 124 may be achieved. Furthermore, each segment 125 in the plurality of segments 125 may be capable of independently expanding, as it is heated, towards center 141 of ferromagnetic plug 132 and transmitting a force between outer band 134 and center band 130 in a direction parallel to surface 133 of support membrane structure 112.

For example, when the assembly comprising ferromagnetic plug 132 and center band 130 is "switched" to a low coefficient of friction (heated state), force transmitted between the low friction assembly and medium friction outer band 134 may result in movement of the assembly relative to surface 133 while outer band 134 stays still. Conversely, when the assembly comprising ferromagnetic plug 132 and center band 130 is "switched" to a high coefficient of friction (cooled state), force transmitted between the high friction assembly and medium friction outer band 134 may result in movement of outer band 134 relative to surface 133 while the assembly stays still. Thus, by energizing and causing thermal expansion of portions of actuator material region 124 in coordination with "switching" of the assembly comprising ferromagnetic plug 132 and center band 130, actuator 114 can be walked across surface 133, as described in more detail below.

The coefficient of thermal expansion of actuator material region 124 may be chosen to tailor the speed and precision of actuator 114. For example, a lower coefficient of thermal expansion may cause the energized portion of actuator material region 124 to expand less for a given amount of energy input so that actuator 114 moves a smaller distance for the given amount of energy input, decreasing the speed of actuator 114 and concomitantly increasing the precision of adjustments, for example, to reflector segment 106, made by actuator 114. Conversely, a higher coefficient of thermal expansion of actuator material region 124 may increase the speed and concomitantly decrease the precision of adjustments made, for example, to reflector segment 106 by actuator 114.

Actuator mechanism 114 may include a magnetic region 128 positioned on a surface 135 of support membrane structure 112. Magnetic region 128 may include a ferromagnetic material—such as iron, cobalt, or nickel—and may be a ferrous permanent magnet, for example. Magnetic region 128 may be magnetically coupled to ferromagnetic plug 132. The magnetic coupling between magnetic region 128 and ferromagnetic plug 132 may hold magnetic region 128 and ferromagnetic plug 132 on support membrane structure 112 while allowing magnetic region 128 and ferromagnetic plug 132 to slide along surfaces 135 and 133, respectively. Furthermore, a magnetic region 126 may be positioned on surface 135 of support membrane structure 112 and may be magnetically coupled to outer band 134. Magnetic region 126 may include a ferromagnetic material—such as iron, cobalt, or nickel—and also may be, for example, a ferrous permanent magnet. The magnetic coupling between magnetic region 126 and outer band 134 may hold magnetic region 126 and outer band 134 on support membrane structure 112 while allowing magnetic region 126 and outer band 134 to slide along surfaces 135 and 133, respectively. Further, it may be understood that magnetic region 126 may include a band structure or a plurality of individual elements.

Adjustment beam 110 may be magnetically coupled to magnetic region 128 with an end cap 122 fixedly attached to adjustment beam 110. It may be understood that end cap 122 may include a magnetic material which magnetically couples end cap 122 with magnetic region 128. Furthermore, it may be understood that adjustment beam 110 may be attached to magnetic region 128 in an alternative embodiment to the one illustrated in FIGS. 5 and 6.

In operation, actuator 114 may be energized to move from a position A to a second position B as shown in FIGS. 4A and 5. As shown in more detail in FIG. 5, center 141 may move a distance $d_1$ 144 from a point A to a point B by selectively heating and cooling select segments 125 of actuator mechanism 114 in a sequence of events illustrated in FIGS. 7 through 14.

Figure 7:
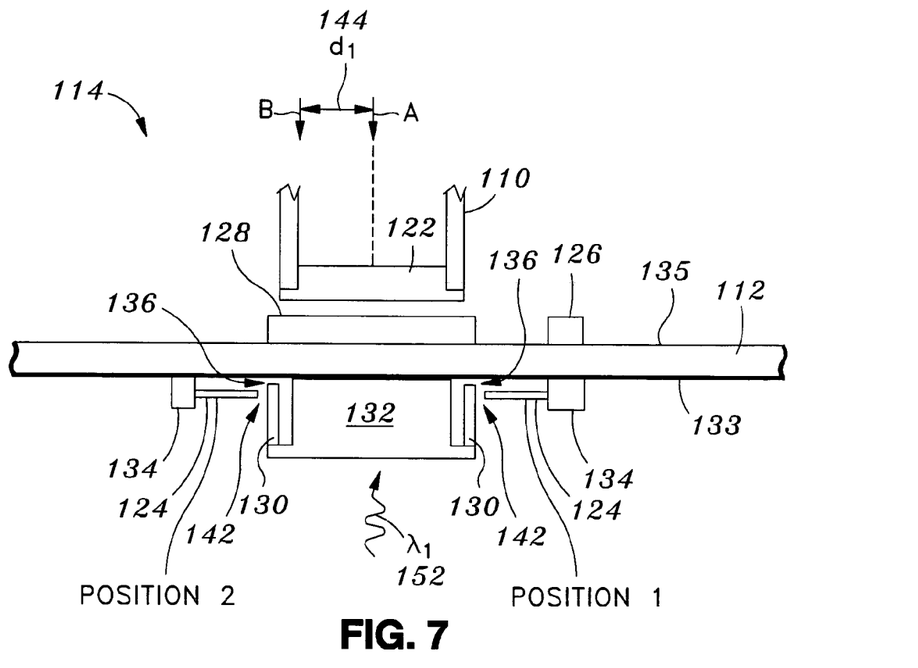
FIG. 7 is a cross-sectional view of the actuator mechanism as illustrated in FIG. 5.
Figure 8:
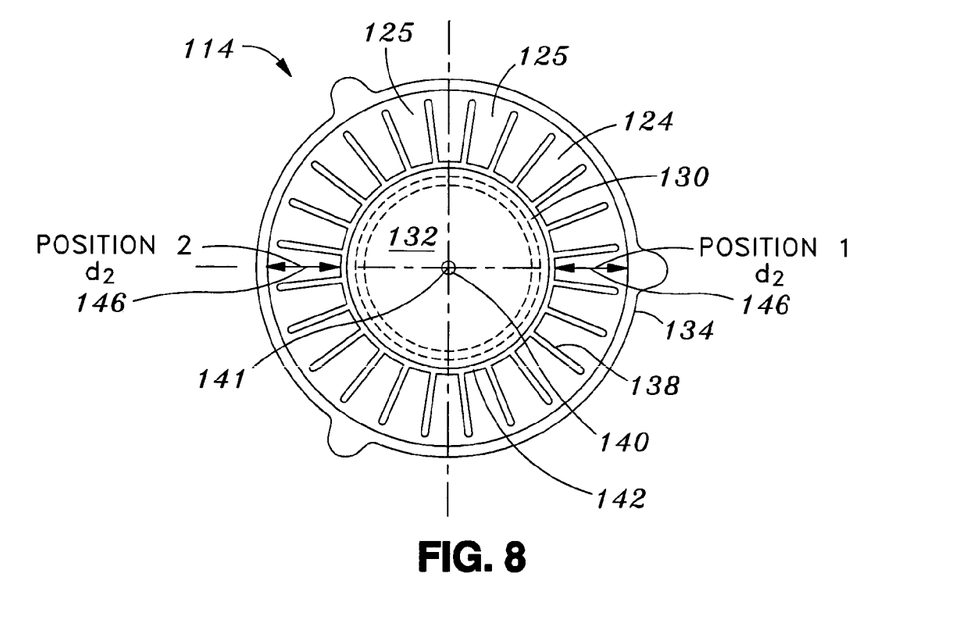
FIG. 8 is a plan view of the actuator mechanism as illustrated in FIG. 7.

FIGS. 7 through 14 illustrate several views of a sequence of events as actuator mechanism 114 moves along support membrane structure 112 from point A to point B. Referring specifically to FIGS. 7 and 8, an energy source (not shown) may direct a beam of energy onto ferromagnetic plug 132 so that plug 132 expands. In the embodiment illustrated in FIGS. 7 through 14, the energy source may include a source of electromagnetic radiation—such as light, infrared, or microwave—with a wavelength $\lambda_1$ 152 where the electromagnetic radiation source may be a laser, for example. Furthermore, it may be understood that reflective target 140 may be used for laser alignment, i.e. to guide the electromagnetic radiation to plug 132. As plug 132 expands, center band 130 may be lifted off of surface 133 to form a gap 136 between band 130 and surface 133. Thus, center band 130 may be frictionally disengaged from surface 133. Furthermore, outer band 134 may be centered about center 141, as shown in FIG. 8. Outer band 134 may be centered about center 141 when a width of actuator material region 124 is equal to $d_2$ 146 for all angles around center 141.

Figure 9:
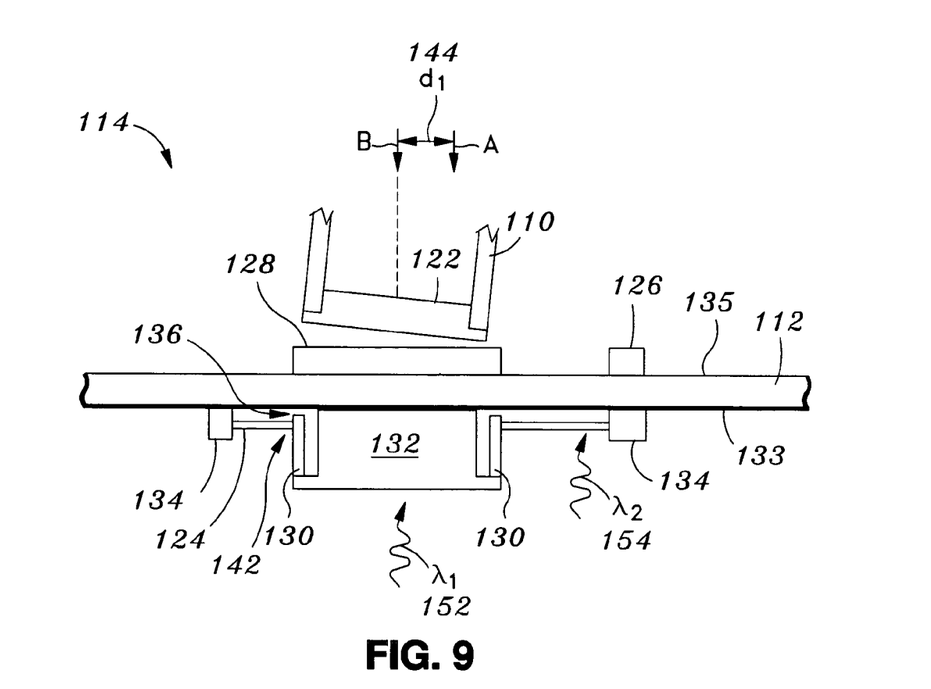
FIG. 9 is a cross-sectional view of the actuator mechanism as illustrated in FIG. 5.
Figure 10:
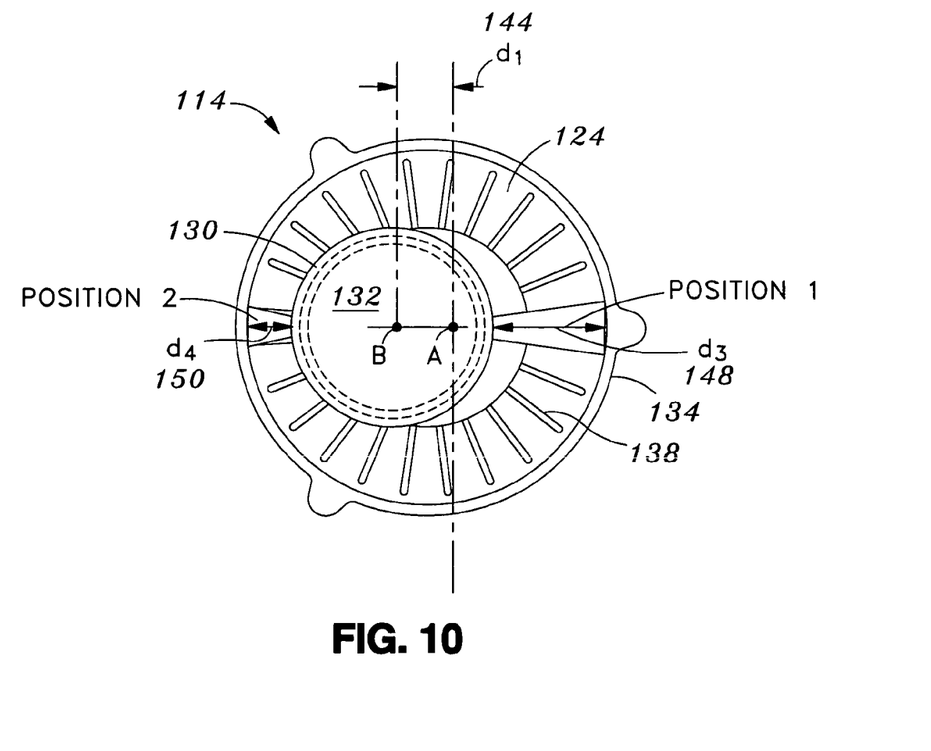
FIG. 10 is a plan view of the actuator mechanism as illustrated in FIG. 9.

Referring now to FIGS. 9 and 10, the energy source may apply heat to actuator material region 124 at a Position 1 so that region 124 expands at Position 1 and distance $d_2$ 146 at Position 1 increases to a distance $d_3$ 148, as shown in FIG. 10. Consequently, center 141 moves by a small increment from Point A to Point B as desired. In general, the expansion of actuator material region 124 may be no more than twice gap 142, although it is shown larger for simplicity and illustrative purposes. Furthermore, it should be understood that the small movement may not be sufficient to compress actuator material region 124 at Position 2 as is depicted in the illustration. Thus, the illustrations in FIGS. 9 and 10 are not drawn to scale.

In the embodiment illustrated in FIGS. 7 through 14, the energy source may include an electromagnetic radiation source with a wavelength $\lambda_1$ 152 where the electromagnetic radiation source may be a laser, for example. The distance between center band 130 and outer band 134 at a Position 2 may decrease to a distance $d_4$ 150 as center band 130 is moved within gap 142 between actuator material region 124 and center band 130. Actuator material region 124 at Position 1 may expand towards center 141 as illustrated while outer band 134 is frictionally held in place because the coefficient of friction of band 134 is greater than the coefficient of friction of plug 132. Thus, outer band 134 is no longer centered about center 141.

Figure 11:
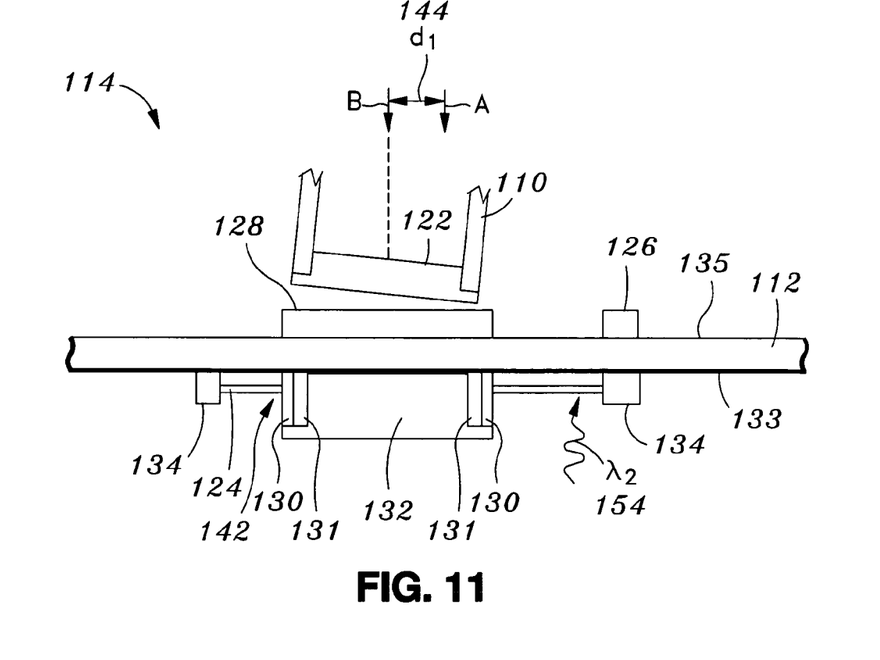
FIG. 11 is a cross-sectional view of the actuator mechanism as illustrated in FIG. 5.
Figure 12:
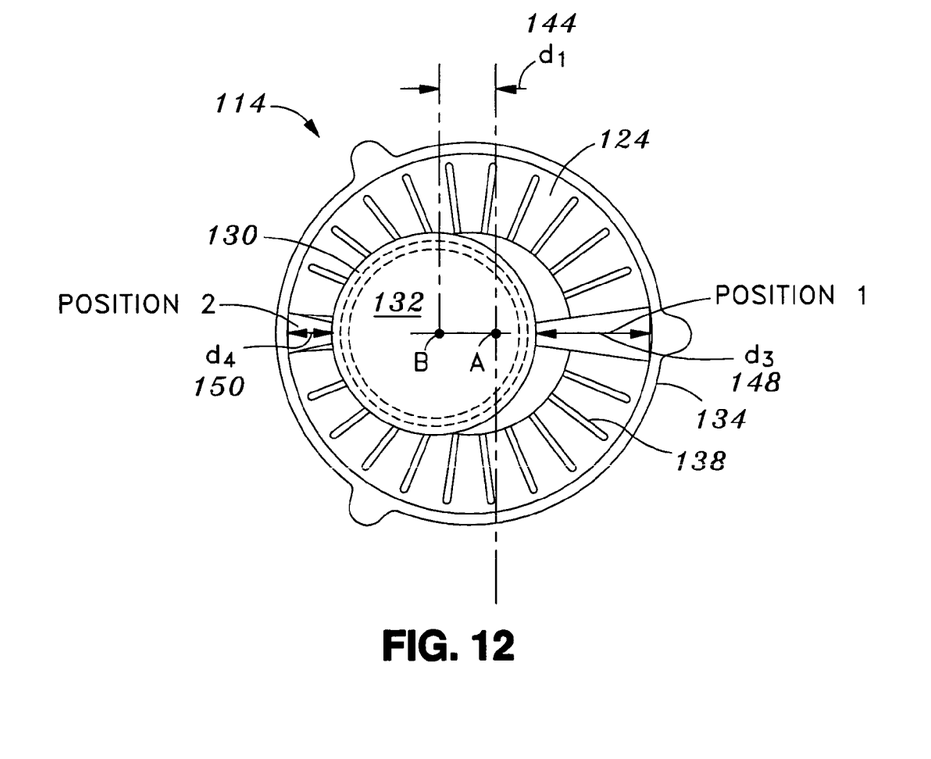
FIG. 12 is a plan view of the actuator mechanism as illustrated in FIG. 11.

Referring now to FIGS. 11 and 12, the energy source may be removed from ferromagnetic plug 132 so that ferromagnetic plug 132 decreases in temperature and contracts so that center band 130 frictionally engages surface 133. Outer band 134 may be no longer centered about center 141 as illustrated in FIG. 12.

Figure 13:
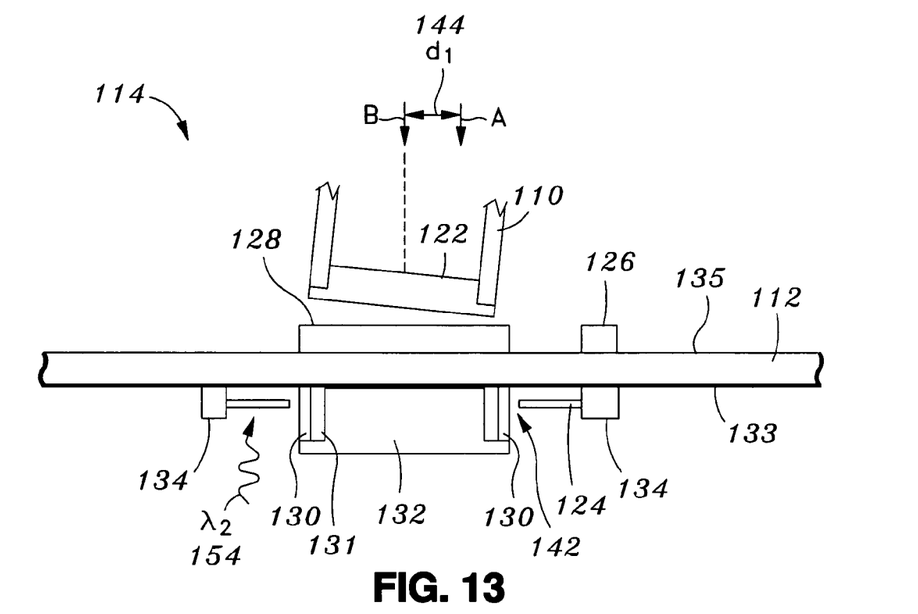
FIG. 13 is a cross-sectional view of the actuator mechanism as illustrated in FIG. 5.
Figure 14:
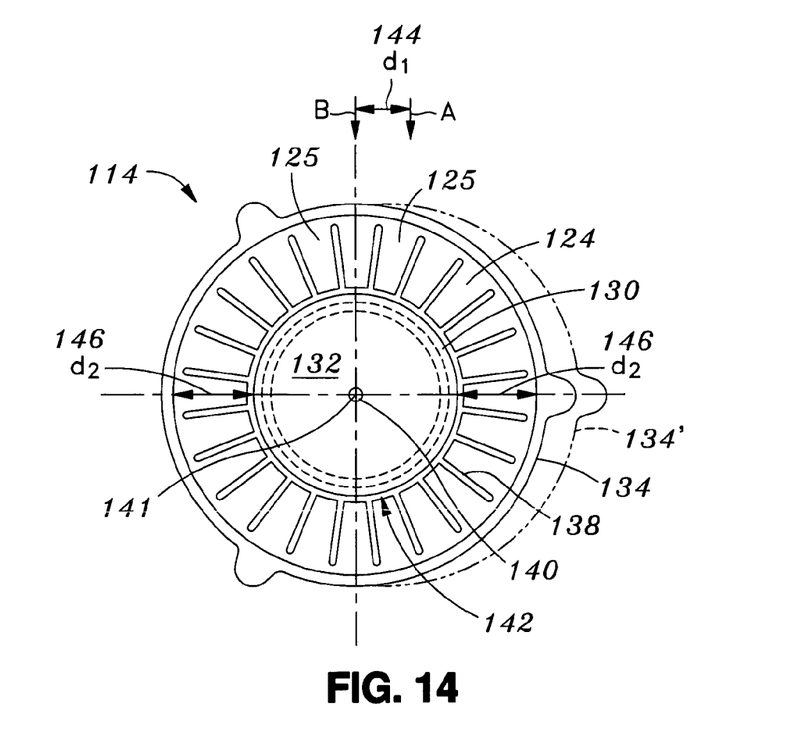
FIG. 14 is a plan view of the actuator mechanism as illustrated in FIG. 13.

Referring now to FIGS. 13 and 14, the energy input may be removed from actuator material region 124 at Position 1 and ferromagnetic plug 132 may be held in place by the coefficient of friction of center band 130. Furthermore, a heat source may be applied to actuator material region 124 at Position 2, as shown in FIG. 12, to realign outer band 134 around center 141 as illustrated in FIG. 14, where the previous position of outer band 134 is shown in phantom as outer band 134'. Actuator material 124 at Position 2 will expand in a direction away from center 141 because the coefficient of friction of center band 130 is greater than the coefficient of friction of outer band 134. Thus, outer band 134 will become centered about center 141 as distance $d_4$ 150 increases to $d_2$ 146.

It may be understood that one or more lasers may be used to heat ferromagnetic plug 132 and actuator material region 124. Furthermore, it may be understood that the lasers may have the same wavelength or may have different wavelengths where the wavelength $\lambda_1$ 152 or $\lambda_2$ 154 may be chosen for the material included in ferromagnetic plug 132 and actuator material region 124.

A method of moving actuator mechanism 114 along a support membrane structure 112, in accordance with the present invention may begin with a step of heating a ferromagnetic plug 132 until center band 130 lifts off of surface 133. Actuator material region 124 may be heated at a Position 1 until actuator material region 124 at Position 1 expands and moves center 141 from Point A to Point B. Ferromagnetic plug 132 may be cooled by removing the heat to plug 132 so that plug 132 contracts and center band 130 frictionally engages surface 133. Actuator material region 124 at a Position 2 may be heated so that region 124 at Position 2 expands in a direction away from center 141 so that outer band 134 becomes centered about center 141. Once outer band 134 may be centered, the input of heat may be removed from actuator material region 124 at Position 2. The process may be repeated to again move center 141 until actuator mechanism 114 may be moved to the desired position.

Figure 15:
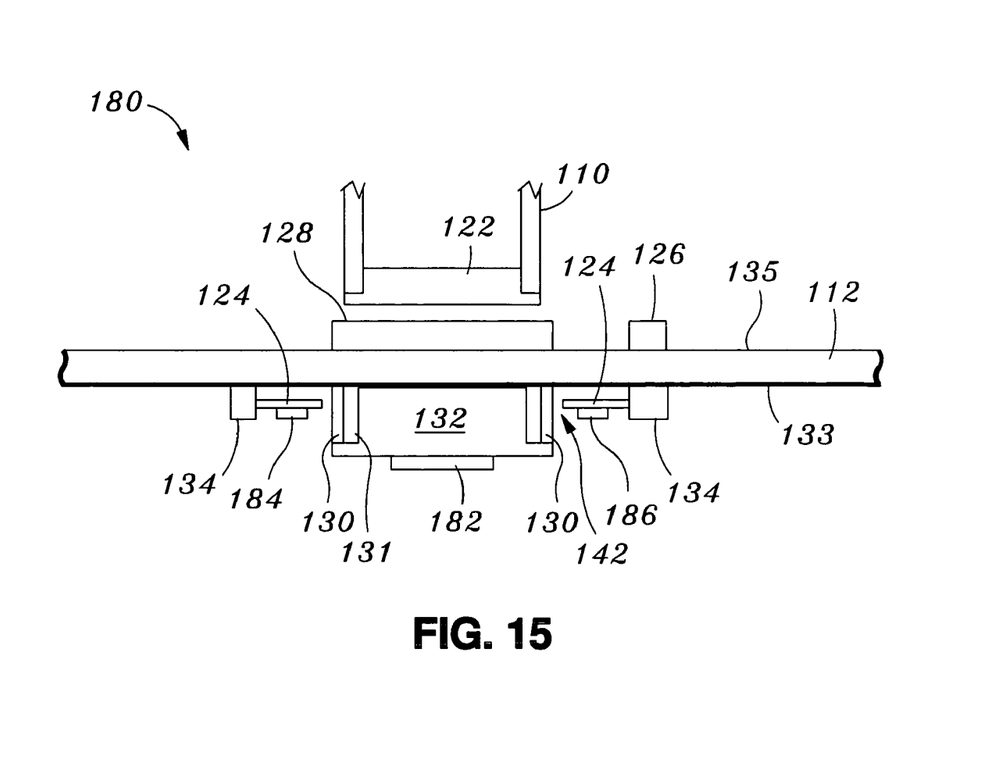
FIG. 15 is a cross-sectional view of an actuator mechanism in accordance with another embodiment of the present invention.

FIG. 15 illustrates an actuator mechanism 180, in accordance with another embodiment of the present invention, in which the heat source includes a current source. Actuator mechanism 180 may include a conductive terminal 182 electrically connected to ferromagnetic plug 132 and conductive terminals 184 and 186 electrically connected to actuator material region 124 at Positions 1 and 2, respectively. Hence, conductive terminals 182, 184, and 186 may be used to provide an electric current to actuator material region 124 or plug 132 and heat actuator material region 124 and plug 132 as discussed above in FIGS. 7 through 14.

It should be understood, of course, that the foregoing relates to preferred embodiments of the invention and that modifications may be made without departing from the spirit and scope of the invention as set forth in the following claims.

We claim:

1. An actuator mechanism for movement along a support membrane structure, said actuator mechanism comprising:
   a ferromagnetic plug with a first coefficient of thermal expansion and a first coefficient of friction, said ferromagnetic plug being positioned on a surface of said support membrane structure and magnetically coupled to said support membrane structure;
   a center band with a third coefficient of friction, said center band being positioned on the surface of said support membrane structure and fixedly attached to said ferromagnetic plug, said center band encircling said ferromagnetic plug;
   an actuator material region with a second coefficient of thermal expansion, said actuator material region being positioned above the surface of said support membrane structure and adjacent to said center band, said actuator material region being separated from said ferromagnetic plug by said center band; and
   an outer band with a second coefficient of friction fixedly attached to said actuator material region, said outer band being positioned on the surface of said support membrane structure and adjacent to said actuator material region and said outer band being magnetically coupled to said support membrane structure.

2. The mechanism of claim 1 wherein:
   said support membrane structure is diamagnetic;
   said ferromagnetic plug is coupled to said support membrane structure by magnetic attraction of said ferromagnetic plug to a first magnetic region through said diamagnetic support membrane structure; and
   said outer band is coupled to said support membrane structure by magnetic attraction of said outer band to a second magnetic region through said diamagnetic support membrane structure; and
   said ferromagnetic plug is thermally expandable to lift said center band off the surface of said support membrane structure.

3. The mechanism of claim 1 wherein said actuator material region includes a plurality of slots extending radially outward from around said ferromagnetic plug.

4. The mechanism of claim 1 wherein a portion of said actuator material region is capable of expanding towards a center of said ferromagnetic plug in a direction parallel to the surface of said support membrane structure.

5. The mechanism of claim 1 wherein said actuator material region includes a plurality of segments, said plurality of segments formed by a plurality of slots.

6. The mechanism of claim 5 wherein each segment in the plurality of segments is capable of expanding towards a center of said ferromagnetic plug in a direction parallel to the surface of said support membrane structure.

7. The mechanism as claimed in claim 1 wherein the first coefficient of friction is less then the second coefficient of friction and the second coefficient of friction is less then the third coefficient of friction.

8. The mechanism as claimed in claim 1 wherein said actuator material region encircles said ferromagnetic plug.

9. An actuator mechanism for movement along a diamagnetic support membrane structure, said actuator mechanism comprising:
   a ferromagnetic plug with a first coefficient of thermal expansion and a first coefficient of friction, said ferromagnetic plug being positioned on a surface of said support membrane structure, said ferromagnetic plug being capable of expanding in a direction perpendicular to the surface of said support membrane structure;
   a center band with a third coefficient of friction, said center band being positioned on the surface of said support membrane structure and fixedly attached to said ferromagnetic plug, said center band encircling said ferromagnetic plug;
   an actuator material region with a second coefficient of thermal expansion, said actuator material region being positioned above the surface of said support membrane structure and around said ferromagnetic plug, said actuator material region being capable of expanding in a direction parallel to the surface of said support membrane structure;
   an outer band with a second coefficient of friction, said outer band being positioned on the side of said support membrane structure and encircling said actuator material region;
   a first magnetic region positioned on the opposed surface of said support membrane structure and adjacent to said ferromagnetic plug; and
   a second magnetic region positioned on the opposed surface of said support membrane structure and adjacent to said outer band.

10. The mechanism of claim 9 wherein said actuator material region is separated from said center band.

11. The mechanism of claim 9 wherein said actuator material region includes a plurality of slots diverging radially outwardly from a center of said ferromagnetic plug.

12. The mechanism of claim 9 further including a reflective target positioned on a center of said ferromagnetic plug.

13. The mechanism of claim 9 further including an adjustment beam magnetically coupled with said first magnetic region.

14. The mechanism of claim 13 further including at least one of an optical reflector and an antenna structure attached to said adjustment beam.

15. The mechanism of claim 9 further including at least one conductive terminal electrically connected to at least one of said ferromagnetic plug and said actuator material region.

16. The mechanism as claimed in claim 9 further including at least one light source capable of directing a beam of light onto at least one of said ferromagnetic plug and said actuator material region.

17. A mechanical system comprising:
   a support membrane structure that is diamagnetic;
   an actuator mechanism positioned on a surface of said support membrane structure, said actuator mechanism including
      a ferromagnetic plug with a first coefficient of thermal expansion and a first coefficient of friction, said ferromagnetic plug being positioned on a surface of said support membrane structure, said ferromagnetic plug being capable of expanding in a direction perpendicular to the surface of said support membrane structure;
      a first band with a third coefficient of friction, said first band being positioned on the side of said support membrane structure and fixedly attached to said ferromagnetic plug, said first band encircling said ferromagnetic plug;
      an actuator material region with a second coefficient of thermal expansion, said actuator material region being positioned on the surface of said support membrane structure and around said first band, said actuator material region being capable of expanding in a direction parallel to the surface of said support membrane structure;
      a second band with a second coefficient of friction, said second band being positioned on the surface of said support membrane structure and around said actuator material region, said second band being fixedly attached to said actuator material;
      a first magnetic region positioned on an opposed surface of said support membrane structure and magnetically coupled to said ferromagnetic plug; and
      a second magnetic region positioned on the opposed surface of said support membrane structure and magnetically coupled to said second band;
   an adjustment beam magnetically coupled to said first magnetic region;
   a frame structure connected to said adjustment beam;
   a reflector segment attached to said adjustment beam; and
   at least one heat source capable of heating at least one of said ferromagnetic plug and said actuator material region.

18. The system of claim 17 wherein said reflector segment includes a mirror.

19. The system of claim 17 wherein said reflector segment has one of a circular shape and a hexagonal shape.

20. The system of claim 17 wherein said at least one heat source includes one of a light source and a current source.

21. A reflector system comprising:
   a support membrane structure with an actuator mechanism wherein said support membrane structure is diamagnetic and said actuator mechanism includes:
      a ferromagnetic plug with a first coefficient of thermal expansion and a first coefficient of friction, said ferromagnetic plug being positioned on a surface of said support membrane structure, said ferromagnetic plug being capable of expanding in a direction perpendicular to the surface of said support membrane structure;
      a first band with a third coefficient of friction, said first band being positioned on the side of said support membrane structure and fixedly attached to said ferromagnetic plug, said first band encircling said ferromagnetic plug;

an actuator material region with a second coefficient of thermal expansion, said actuator material region being positioned on the surface of said support membrane structure and around said first band, said actuator material region being capable of expanding in a direction parallel to the surface of said support membrane structure;

a second band with a second coefficient of friction, said second band being positioned on the surface of said support membrane structure and around said actuator material region, said second band being fixedly attached to said actuator material;

a first magnetic region positioned on an opposed surface of said support membrane structure and magnetically coupled to said ferromagnetic plug; and a second magnetic region positioned on the opposed surface of said support membrane structure and magnetically coupled to said second band;

an adjustment beam with an end, the end of said adjustment beam being attached to the actuator mechanism;

a frame structure attached to an opposed end of said adjustment beam; and a reflector segment attached to said adjustment beam.

22. A method of moving an actuator mechanism along a support membrane structure, said method comprising the steps of:

increasing a first temperature of a ferromagnetic plug wherein said ferromagnetic plug expands in a direction perpendicular to a surface of said support membrane structure lifting a center band off the surface of said support membrane structure;

increasing a second temperature of an actuator material region at a first position wherein said actuator material region expands at the first position in a direction parallel to the surface of said support membrane structure moving said ferromagnetic plug and said center band in a direction parallel to the surface of said support membrane structure;

decreasing the first temperature so that said ferromagnetic plug contracts and said center band frictionally engages the surface of said support membrane structure;

decreasing the second temperature; and increasing a third temperature of said actuator material at a second position wherein said actuator material region expands at the second position in a direction parallel to the surface of said support membrane structure.

23. The method as claimed in claim 22 further including a step of decreasing the third temperature.

24. The method as claimed in claim 22 wherein said step of increasing the first temperature includes a step of directing a laser light source onto said ferromagnetic plug.

25. The method as claimed in claim 22 wherein said step of increasing the second temperature includes a step of directing a laser light source onto the first position of said actuator material region.

26. The method as claimed in claim 22 wherein said step of increasing the third temperature includes a step of directing a laser light source onto the second position of said actuator material region.

27. The method as claimed in claim 22 wherein said step increasing the first temperature includes a step of flowing an electric current through said ferromagnetic plug.

28. The method as claimed in claim 22 wherein said step of increasing the second temperature includes a step of flowing an electric current through the first position of said actuator region.

29. The method as claimed in claim 22 wherein said step of increasing the third temperature includes a step of flowing an electric current through the second position of said actuator region.

30. The method as claimed in claim 22 wherein said step of increasing the third temperature includes a step of choosing the second position so that the outer band becomes centered about a center of said ferromagnetic plug.

31. The method as claimed in claim 22 wherein said step increasing the third temperature includes a step of choosing the second position to be 180° from the first position.

32. A method of moving a reflector system relative to a support membrane structure, said method comprising the steps of:

directing a first beam of energy onto a ferromagnetic plug magnetically coupled to a reflector segment, the first beam of energy causing a first temperature in said ferromagnetic plug to increase wherein said ferromagnetic plug expands in a direction perpendicular to a surface of said support membrane structure, lifting a center band encircling said ferromagnetic plug off the surface of said support membrane structure;

directing a second beam of energy onto an actuator material region encircling said center band, the second beam of energy causing a second temperature in said actuator material region to increase at a first position wherein said actuator material region expands in a direction parallel to the surface of said support membrane structure, moving said ferromagnetic plug, center band, and said reflector segment in a direction parallel to the surface of said support membrane structure;

turning off said first beam of energy causing the second temperature to decrease so that said center band frictionally engages the surface of said support membrane structure;

turning off said second beam of energy causing the second temperature to decrease; and directing at least one of the first and second beams of energy onto said actuator material region at a second position causing said outer band to move in a direction parallel to the surface of said support membrane structure to become centered about a center of said ferromagnetic plug.

33. The method as claimed in claim 32 wherein said step of directing at least one of said first and second beams of energy onto said actuator material region includes a step of turning on a laser.

34. The method as claimed in claim 32 wherein said step of directing said first beam of energy includes a step of directing said first beam of energy at a reflector target positioned on the center of said ferromagnetic plug.

35. The method as claimed in claim 32 wherein said step of directing said second beam of energy onto said actuator material at the first position includes a step of expanding said actuator material region at the first position in a direction towards the center of said ferromagnetic plug.

36. The method as claimed in claim 32 wherein said step of directing said at least one said first and second beam of energy onto said actuator material at the second position includes a step of expanding said actuator material region at the second position in a direction away from the center of said ferromagnetic plug.

37. The method as claimed in claim 32 wherein said step of heating said actuator material region at said first position includes a step of increasing the second temperature of said actuator material region at said first position to be greater than a temperature of said actuator material at said second position.

38. The method as claimed in claim 32 wherein said step of heating said actuator material region at said second position includes a step of increasing a third temperature of said actuator material region at said second region to be greater than the second temperature of said actuator material at said first position.

* * * * *